United States Patent [19]
Li

[11] Patent Number: 5,128,932
[45] Date of Patent: Jul. 7, 1992

[54] TRAFFIC FLOW CONTROL AND CALL SET-UP IN MULTI-HOP BROADBAND NETWORKS

[75] Inventor: Shuo-Yen R. Li, Gillette

[73] Assignee: Bell Communications Research, Inc., Livingston, N.J.

[21] Appl. No.: 572,712

[22] Filed: Aug. 27, 1990

[51] Int. Cl.⁵ ............................................. H04Q 11/04
[52] U.S. Cl. ..................... 370/60; 370/85.6; 370/94.1
[58] Field of Search ................ 370/13, 16, 54, 60, 370/60.1, 85.6, 85.7, 94.1, 94.3, 95.1; 340/825.03, 826, 827, 825.5, 825.51, 825.52; 379/219, 220, 221, 271, 272, 273

[56] References Cited

U.S. PATENT DOCUMENTS

| | | | |
|---|---|---|---|
| 4,020,052 | 5/1991 | DePrycker et al. | 370/60 |
| 4,740,954 | 4/1988 | Cotton et al. | 370/60 |
| 4,769,810 | 9/1988 | Eckberg, Jr. et al. | 370/94.1 |
| 4,953,157 | 8/1990 | Franklin et al. | 370/94.1 |
| 4,979,118 | 12/1990 | Kheradpir | 370/54 |
| 5,056,085 | 10/1991 | Vu | 370/94.1 |

*Primary Examiner*—Benedict V. Safourek
*Assistant Examiner*—Alpus H. Hsu
*Attorney, Agent, or Firm*—Leonard Charles Suchyta; John T. Peoples

[57] ABSTRACT

A methodology is disclosed for traffic control administered locally at each individual node in a packet network. Packet level controls at a node pertain to whether to admit a new packet into the network and whether to momentarily detain passing-through packets. The nodes apply the "back-pressure" of congestion on one another and thereby cooperate to smooth traffic and alleviate the accumulation of packets at any single node. The decision process in packet level control involves two basic operations. First, the address of the packet is translated into a binary word via a static routing table and then, secondly, the binary word and control data representative of dynamic traffic information are operated on logically; traffic control decisions, such as detain a passing-through packet or permit entry of a packet into the network, are based primarily on the result of the logical operation. In setting-up a real-time call, a stream, of scout packets representative of the real-time packets is screened for entry into the network as influx packets. If all scout packets are permitted to enter the network in a given time period, then the real-time data packets are cleared for propagation.

10 Claims, 10 Drawing Sheets

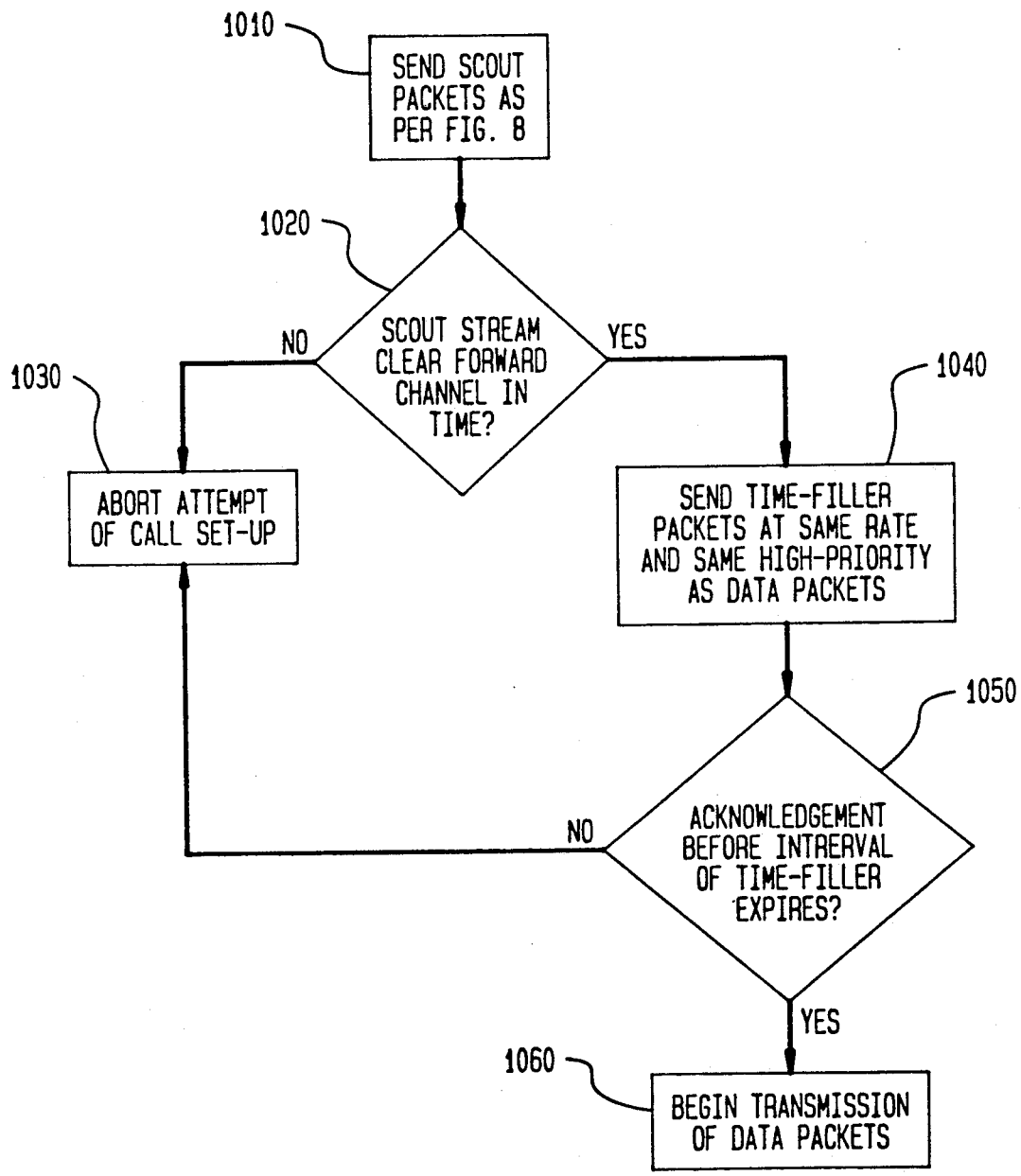

TRAFFIC FLOW CONTROL AND CALL SET-UP IN MULTI-HOP BROADBAND NETWORKS

FIELD OF THE INVENTION

This invention relates to a communication network and, more particularly, to a methodology for the decentralized control of traffic flow in a multi-hop broadband network and a concomitant methodology for establishing communication channels to route packets of real-time calls.

BACKGROUND OF THE INVENTION

In a multi-hop packet communication network, routes of packets with different sources and destinations may intersect at a common hop, that is, some packets may share a certain link between two nodes in the network. When the combined traffic density on such routes bursts to exceed the link capacity of the common hop, packets queue up at the originating end of the shared link. The queue packets are stored in buffer memory at a node. To preclude buffer overflow for broadband communication applications, some constraint must be exercised over the traffic flow inside the network. Since the transmission capacity of the network has a limit, the packet influx into the network must also be constrained.

The conventional approach to control traffic flow in networks such as the telephone network relies on the use of a control center, which collects and manages real-time traffic data of the whole network. The implementation of such central control incurs huge overhead because of the added requirements of both network facilities and transmission capacity, as well as complexity of design. This renders the approach of having a central control largely ineffective for broadband packet networks.

Communications in real-time, including video, voice, and certain data communications such as computer-to-computer connections, cannot be interrupted once the communication or call is flowing. In order to avoid buffer overflowing, a call set-up process therefore must be responsible for the volume control of periodic streams of packets generated by such continuous real-time communications.

The conventional approach of call set-up is to reserve transmission/switching bandwidths. In the environment of packet switching, this approach is called the circuit emulation mode. In a network with decentralized control, this mode calls for every node to keep track of the total bandwidth of ongoing calls on each of its links and to allocate the link bandwidth for new requests of call set-up. A new call is set up when the bandwidth allocation on all links on its route of transmission is secured. There are some disadvantages with the circuit emulation mode. First, it requires the intelligence of the node to keep track of link bandwidths and to allocate them. Secondly, back and forth inter-node communications is involved in the process of call set-up and tear-down, especially for a mulit-hop call. In order to be compatible with the speed of broadband hardware, it is desirable that the network function of a node requires as little intelligence as possible. This leads to the search of ways of achieving the same objective of circuit emulation without the actual work of bandwidth reservation in setting up a call.

SUMMARY OF THE INVENTION

These deficiencies and other shortcomings and limitations are precluded in accordance with the present invention by strategically (i) detaining packets already in the network at points along their routes in anticipation of probable congestion ahead of them, (ii) rejecting the influx of new packets in anticipation of a congested network, and (iii) for real-time communications, transmitting test packets to determine if packets containing data can enter the network.

In accordance with the broad aspect with this invention relating to traffic flow control, periodically a sequence of control packets is propagated over control channels to all the nodes in the network. Each node stores a set of network masks wherein each mask is indicative of the nodal topology and relates a group of remote links to an incoming control channel. Upon receiving a set of control packets, a first screening vector is generated from the masks and the incoming control packets. Each node, after determining the congestion status of its outgoing links, computes a second screening vector from this congestion status and the first screening vector. The first screening vector is then used to control packets already in the network, and the second screening vector controls packet influx into the network.

In setting-up a real-time call, a stream of test or scout packets representative of the real-time data packets—in the sense of having the same route—is screened for entry into the network using the second screening vector. If all of the scout packets in the stream are permitted to enter the network within a given time duration, then the data packets of the real-time call are propagated over the network. If entry of the scout stream is denied, then the call set-up is aborted. Retransmission may be attempted after a specified waiting time.

The methodology of the present invention requires no centralized controller and there is no need to track bandwidth usage. This methodology also has the advantage of precluding buffer overflow caused by concentrated packet accumulation at a buffer of a single node in the network. A typical traffic control decision involves just two primitive operations—a READ and a logical AND—thereby engendering a rapid control decision. This processing speed enables the traffic control to be implementable on the packet level for broadband communications with a moderate packet size. The control algorithm associated with the control methodology also provides for high utilization of broadband facilities and preserves the order among sequential packets. The algorithm is administered locally at individual nodes. Accordingly, the flow control function at a node includes the control of traffic volume. The flow control algorithm makes the decision on whether to momentarily detain a passingthrough packet as well as on whether to admit the entry of a locally generated packet into the network. With feasible sizes of buffers, the algorithm ensures no buffer overflowing or traffic deadlock.

The set-up of the routing path of a one-way call is executed solely at the traffic originating nodes and thereby requires no inter-node communications. This leads to a simple process of call set-up that ensures the continuous flow of ongoing calls and, at the same time, avoids buffer overflow.

BRIEF DESCRIPTION OF THE DRAWING

FIG. 10 is a flow diagram for the customer interface processing of a two-way call.

DETAILED DESCRIPTION

Figure 1:
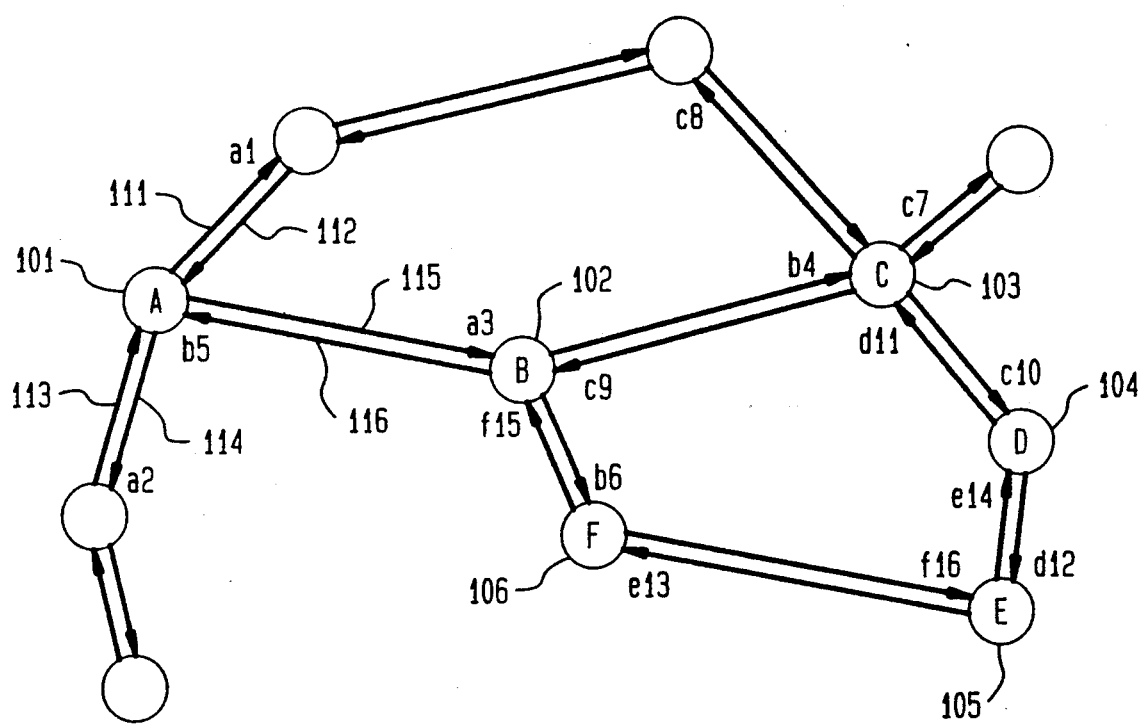
FIG. 1 depicts a simplified network showing the interconnection of nodes with links and introduces the naming convention.

The description commences by defining certain terminology and notation as well as providing an overview which will be helpful in elucidating the inventive aspects of the present invention.

A link is defined as a one-directional channel from one node to another. Channels in opposite directions are treated as two separate links. Outgoing links from a node will be referred to as links owned by that node, and all other links in the network will be remote links with respect to that node. A physical link is logically divided into a data channel and a control channel; the control channel utilizes a small portion of the available bandwidth.

OVERVIEW OF FLOW CONTROL METHODOLOGY

There are two aspects of traffic control in the flow control methodology: traffic information management and packet-level controls.

Traffic information management, which is via the control channel, operates as follows. Every node in the network constantly assesses the congestion status of its outgoing links and broadcasts this information to other nodes to which it is directly connected—its neighbor nodes—via control channels. In fact, a node broadcasts not only the current status of its own links but also its best assessment of the status of other links. Through such constant exchange of information between neighbors, every node acquires global traffic information from its neighbors with possible contradictions among different sources due, for instance, to different time lags. Then, with the aid of static data—the network mask—characterizing the topography of the network, each node extracts from the ensemble of received information the most updated knowledge about each remote link. The accuracy of this updated knowledge depends upon the distance between the node and the remote link.

Packet-level controls at an arbitrary node pertain to the decisions on the admission of new packets into the network and on the detention of passing-through or intermediate packets. The basic scheme is for each node to apply the "back pressure" of traffic congestion on one another and thereby cooperate in smoothing the traffic and alleviating the problem of excessive packet accumulation at the buffer of any single node. Since the network does not allow unlimited influx of packets into the network, some capability of customer interface is assumed: when a new packet is denied entry to the network, it is either buffered or regenerated, and meanwhile, the packet source is notified of the traffic condition.

The decision process in a packet-level control comprises two primitive operations. First, the destination address of a packet is translated into a binary word via a static routing table stored in a high-speed memory. Then, this word is logically ANDed with a vector of dynamic data as derived from the traffic management information. The control decision is purely based upon whether the AND result is zero.

With the call set-up methodology, the originating node of an attempted call generates a periodic stream of "pseudo packets" to test traffic conditions in the network and thereby forms the judgment on whether the new call would cause congestion in the network. No inter-node communication is required for this call set-up process; only the traffic originating node is involved in the process of setting up the one-way flow of a periodic stream of packets.

It is assumed that contents of the final packet of a call include an indication of the ending of the call. Such an indication will be the only signal needed to tear down a one-way transmission under the call set-up methodology. No further communication is needed for the purpose of call control.

ILLUSTRATIVE EMBODIMENT

1. Flow Control Methodology

The multi-hop packet network under consideration is typically a metropolitan area network with the following parameters. There are $N_{lk}$ one-directional links connecting $N_{nd}$ nodes. Some of the nodes are office nodes, where packets originate and terminate; others are simply connection points. Each node owns up to $N_{og}$ outgoing links. For any given pair of origination and termination nodes, a small set of fixed routes is assumed for an extended period of time; this arrangement determines the network topology. Starting from each node, there are a total of up to $N_{rt}$ different routes leading to all office nodes; routes include one or more links. Examples for these parameters are $N_{lk}=1024, N_{nd}=128, N_{rt}=128, N_{og}=16$. No synchronization is assumed between the data transport on any two different links. A link is logically divided into a data channel and a small control channel. A data packet includes the data field and a header. The header includes adequate addressing information to identify the route of the packet. The control channel is for the exchange of control information, including link congestion status, between neighboring nodes.

A control packet includes a link-status vector and a category field. The value of the category field specifies the meaning of the vector, e.g., category 0 may interpret the vector as the link congestion status, category 1 may interpret it as the link abnormality status, category 2 may be for the call set-up function, and so on. Each bit position in this link-status vector corresponds to the congestion status of a link in the network.

In general, the network topology does not necessarily require link-status vectors on a control channel to cover all the links in the network. Thus, the required bandwidth of each control channel may vary. A hierarchical network will be described at the end of Section 1.1 which illustrates the general case. However, in order to facilitate the understanding of the technique for managing traffic, a simplified version will be described first with a simple non-hierarchical network where every link-status vector covers all links in the network. This simple network will also be employed to illustrate the technique of traffic control.

1.1 Traffic Information

The network depicted in FIG. 1 illustrates one naming convention wherein nodes 101-106 are labeled by capital letters and links 111-116, . . . by alphanumerics. In order to emphasize that a link is owned by the node at its originating end, the link number is preceded by the lower-case letter corresponding to the label of the node that owns the link.

Periodically every $N_{pr}$ microseconds, say, $N_{pr}=5$ microseconds, every node determines the 1-bit congestion status of each of its links. The basis of this determination will be detailed in Section 1.4. A bit "1" stands for "congested" and a "0" for "non-congested". The congestion status so established is then stored in a vector which represents the set of all congested links of this node.

Also, in every $N_{pr}$ microseconds, every node broadcasts a control packet to all adjacent nodes through outgoing control channels. This implies every node also receives a control packet from each incoming control channel. Such a vector represents the set of all congested links in the network to the best assessment of the transmitting node at the time of transmission. Vectors received from different control channels may contain contradictory information to one another. The most updated version of the congestion status of a remote link comes through the incoming channel which lies on the shortest route from the owner of the remote link to the receiving node. The length of a route is computed as the total length of all links on the route plus a uniform per-hop overhead corresponding to the $N_{pr}$ microsecond interval between two consecutive broadcasts. The parameter $N_{pr}$ is chosen small enough so that the per-hop overhead does not become a major factor in this computation.

Static network data at a node relates each remote link to the incoming channel through which the most updated status of that remote link is received. This network data is stored in the form of a $N_{lk}$-bit network mask for each incoming control channel, which will be referred to as the network mask in Table 1 below. The vector received from each channel will be logically ANDed with the network mask for that channel. The AND results for all incoming channels are ORed together to form the IN-Vector for each particular node, which represents the set of congested remote links. The IN-Vector then will be ORed with the vector representing the set of congested links of the local node to form the OUT-Vector, which represents the set of all congested links. The OUT-Vector is then loaded into the next control packet for broadcasting.

Figure 2:
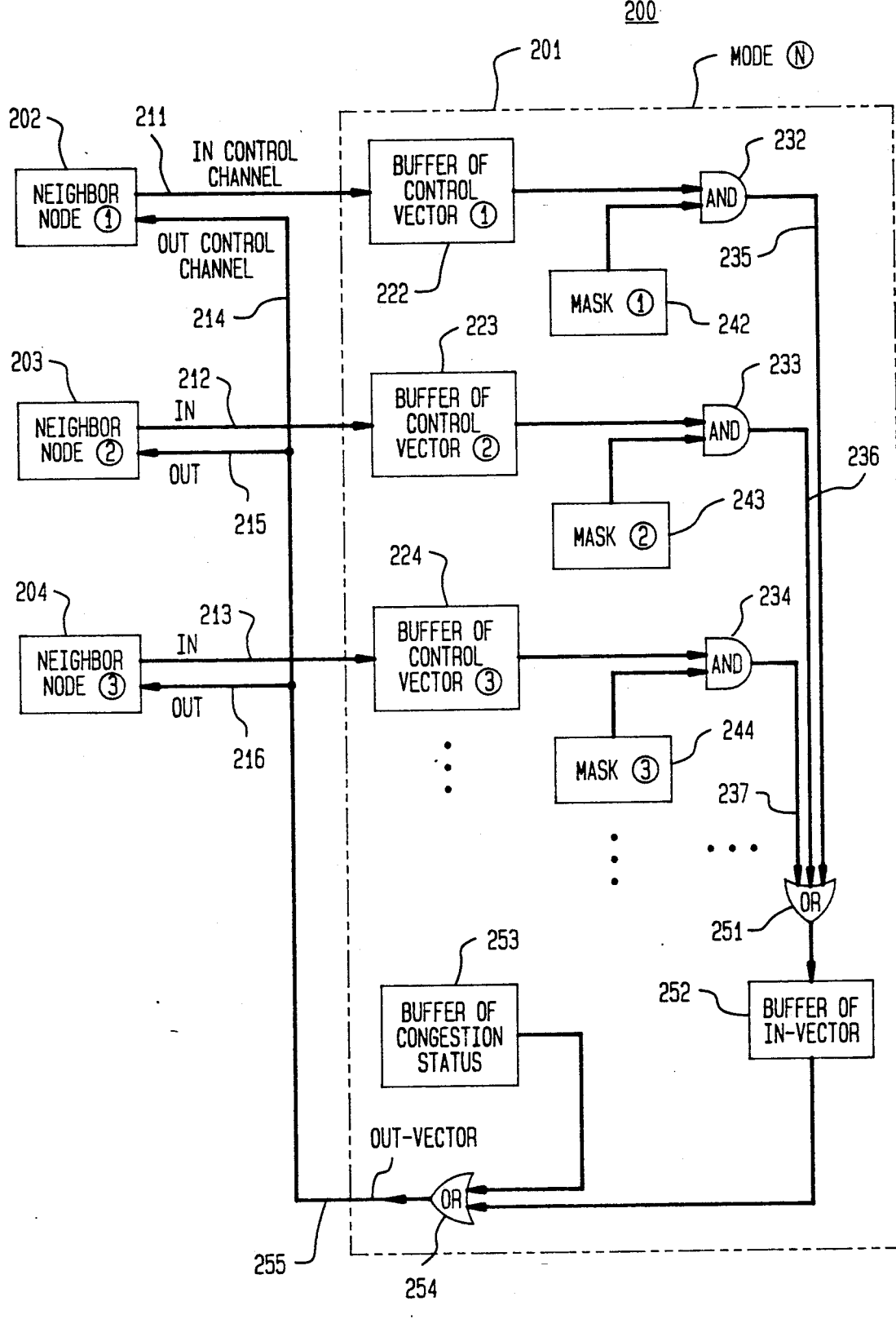
FIG. 2 depicts a block diagram for generating the flow control vectors in an arbitrary node.

The block diagram of FIG. 2 summarizes the generation of the traffic management information and is discussed after the following example.

EXAMPLE

Table 1 below refers to FIG. 1. From the perspective of the node B, the most updated information about links a1, a2 and a3 comes via the incoming link a3, the most updated information about c7, c8, c9, c10, d11, and d12 comes via the incoming link c9, the most updated information about e13, e14, f15, and f16 comes via f15, and so on; this information is used to form the network mask for each neighbor node.

TABLE 1

| Sample Computation of IN-Vector and OUT-Vector | | | |
|---|---|---|---|
| Received From | Control Vector | Network Mask | Logical AND |
| a3 | 0101010101010101 . . . | 1110000000000000 . . . | 0100000000000000 . . . |
| c9 | 0001000110001110 . . . | 0000001111110000 . . . | 0000000110000000 . . . |
| f15 | 0001010101001101 . . . | 0000000000001111 . . . | 0000000000001101 . . . |
| | | IN-Vector (OR): | 0100000110001101 . . . |
| | | Congestion Status of B Links: | xxx010xxxxxxxxxx . . . |
| | | OUT-Vector (OR): | 0100100110001101 . . . |
| | | | (Next Control Vector) |

The diagram of FIG. 2 depicts arbitrary node 201 in network 200 and the operations utilized to process incoming control channels 211-213 which propagate control vectors from neighbor nodes 202-204, respectively, to node 201. Control vectors associated with channels 211-213 are stored in buffers 222-224, respectively, within node 201. Masks 242-244 store information about network topology as to which neighbor has the most pertinent information about the state of network 200. The contents of buffer 222 are ANDed with the contents of mask 242 to produce an output vector on lead 235 as the output of device 232. Similarly, devices 233 and 234 produce output vectors appearing on leads 236 and 237, respectively. Vectors on leads 235-237 are ORed to produce the IN-Vector, which is stored in buffer 252. Buffer 253 stores information about the congestion status of node 201. The OUT-Vector is produced by ORing the contents of buffers 252 and 253 and the OUT-Vector appears on lead 255. Lead 255, as the outgoing control channel from node 201, fans out onto leads 214-216; the OUT-Vector currently generated in this processing period is thereby propagated to neighbor nodes to be processed in the next subsequent control channel processing period.

Figure 3:
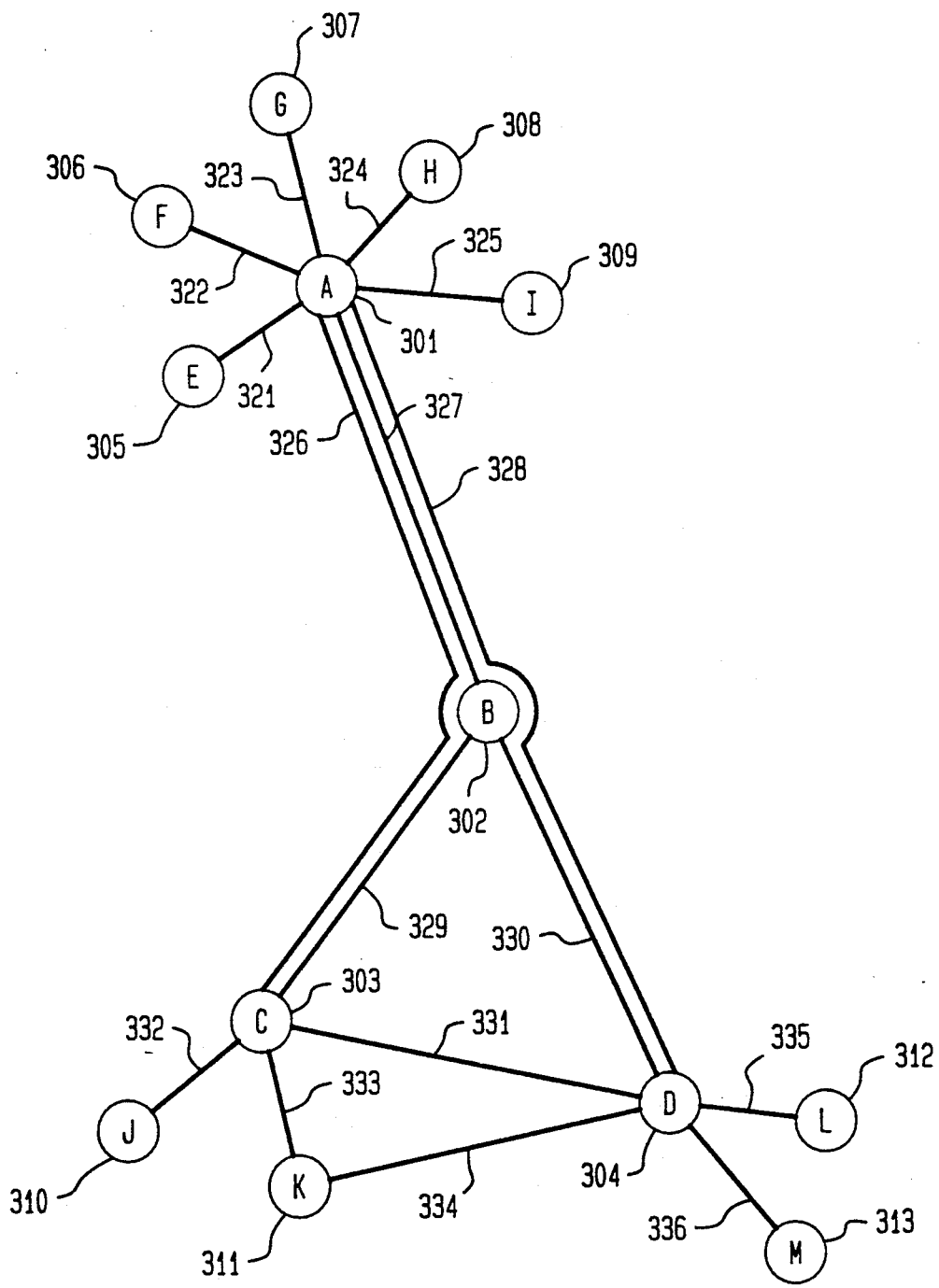
FIG. 3 depicts a general non-hierarchical node network for routing packets in accordance with the present invention.

In the example of the network depicted in FIG. 1, all links have appeared to be in physically separate bundles of transmission media, and the link-status vector in every control channel covers all links in the network. These two characteristics are not necessary constraints on the application of the technique for managing traffic information in the description related to FIG. 1. In the network depicted in FIG. 3, nodes are labeled 301-313 (also corresponding to nodes A-M) and each path 321-336 connecting node pairs represents two links in opposite directions. It is noted that there is physical overlapping among different links in the network of FIG. 3. For instance, one part of C-to-A path 326 can be bundled together with C-to-B link 329 and another part with B-to-A link 327. This C-to-A link was created, for example, to route packets through node 302 (B) while bypassing the switching function of node 302. Control packets on different control channels only need to contain the status of different sets of links. Assuming no link breakdown, a control packet from C-to-A needs to contain the status of only the C-to-J and C-to-K links, while a control packet from C-to-K needs to cover the A-to-E, A-to-F, A-to-G, A-to-H, A-to-I, C-to-B, and C-to-J links. This non-uniform nature of control packets economizes the allocation of the bandwidth required for control channels. Though the economy comes with increased complexity in the computation of the IN-Vector and OUT-Vector, the $N_{pr}$ duration of the control packet interval suffices to complete the computation.

1.2 Control of Traffic Influx to the Network

Figure 4:
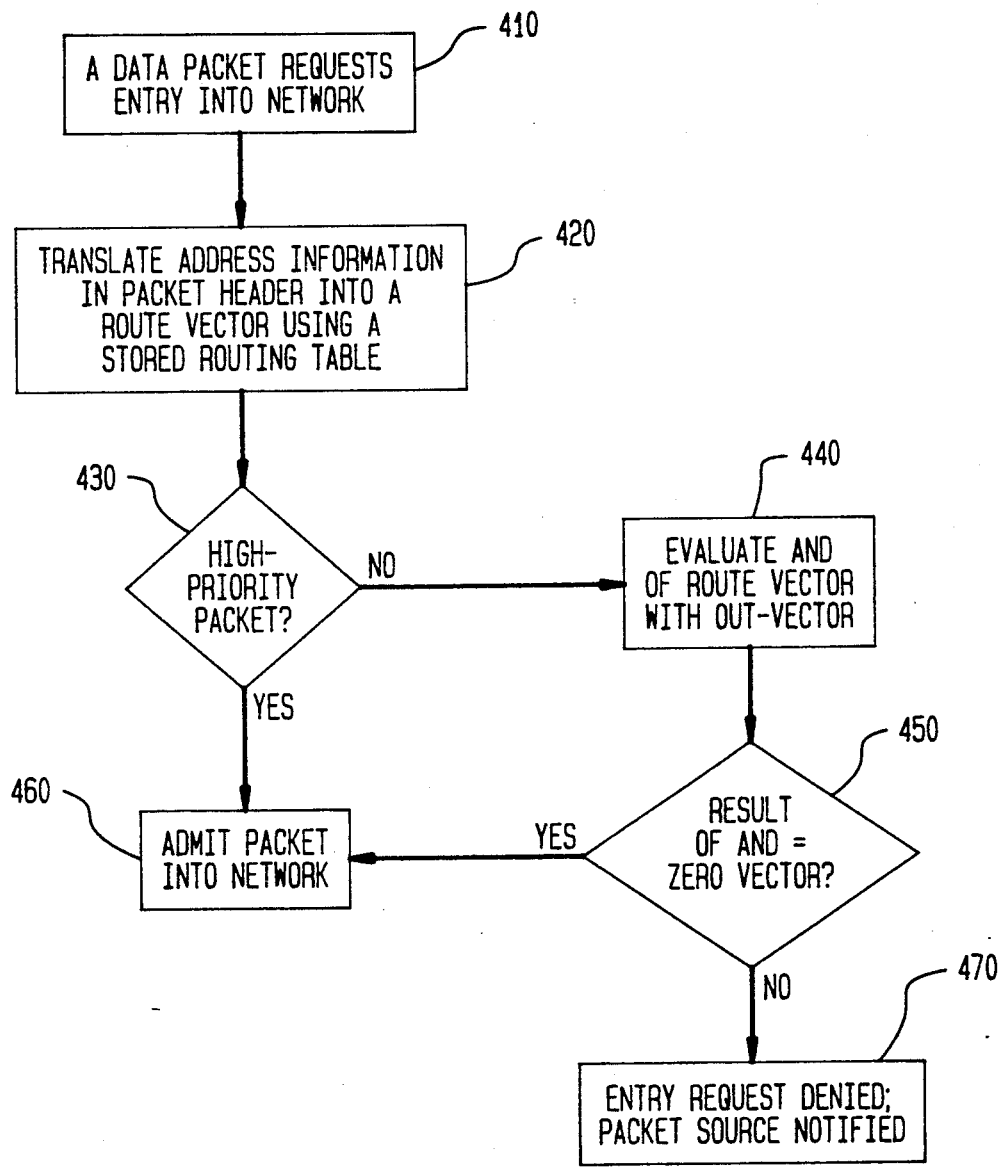
FIG. 4 is a flow diagram on controlling the influx of packets into the network.

With reference to flow diagram 400 of FIG. 4, when a packet requests entry into the network at a node, as depicted by processing block 410, the destination address information stored at the packet header is translated into the set of links on its remaining route. This translation is by a static routing table stored in a high-speed memory at the individual node, and the result is in the form of an link-status vector. The translation step is depicted by block 420. The next processing step is depicted by decision block 430 wherein it is determined if the packet is a high-priority packet. If so, the packet is unconditionally admitted into the network, as shown by block 460. (Unconditional entry of the packet to the networks means that the flow control of such high-priority traffic is by the call set-up process to be described shortly rather than at the packet control level.) Otherwise, processing by block 440 is initiated to evaluate the logical AND of the route vector with the OUT-Vector; the result is called the influx vector. If the influx vector is the zero vector, as tested by decision block 450, then the packet is also admitted into the network via block 460. Otherwise, the entry request is denied and the interface device (not shown) generating the packet is notified that the request has been denied, as effected by processing block 470.

1.3 Control of an Intermediate Packet

Figure 5:
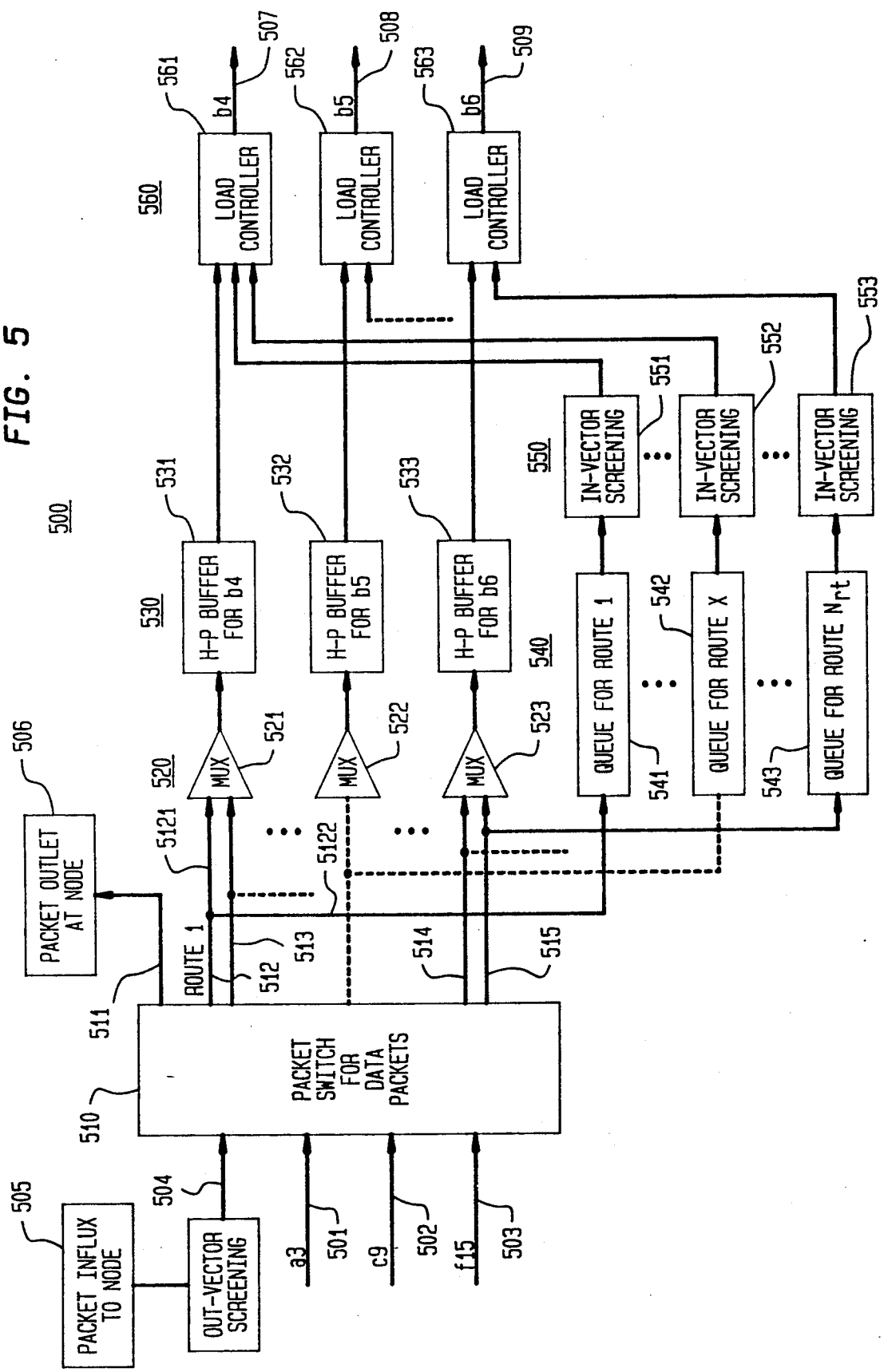
FIG. 5 is a block diagram of a circuit arrangement for propagating packets onto data channels.

Packets that are admitted into the network at a node and packets that have arrived via incoming links, called intermediate packets, are all routed through a packet switch 510, as depicted in FIG. 5 for exemplary node 102 (node B of FIG. 1). The size of switch 510 is $N_{og}$ by $N_{rt}$. Each input 501,502,503 to the switch corresponds to an incoming link, except that, when the node is an office node, there will be one input (lead 504) corresponding to the packet traffic admitted into the network at this node. Outputs 511-515 of the switch are in a one-to-one correspondence with office routes starting at the node. Packets are switched from inputs to outputs through, for example, a self-routing interconnection network or a complete cross-connection. It is assumed that the switching capacity has been engineered to sufficiently compensate for the delay due to output contention in switching.

For an office node, there is a particular output (lead 511) which is connected to facilities that distribute arriving packets to customers. Except for this particular output of an office node, each output 512-515 of the switch, which corresponds to a given route emanating from node B, leads to multiplexer bank 520 and queues 540. For instance, high-priority packets on lead 512 are directed to multiplexer (MUX) 521 via lead 5121, and all other packets on lead 512 are directed to queue 541 via lead 5122. The multiplexers provide a multiple-input to single-output conversion. Each MUX 531-523 serves as an input to high-priority buffer bank 530. Each buffer 531-533 is associated with a given outgoing link. For instance, buffer 532 stores high-priority packets for link b5. Each route leading to another node has an associated queue 541-543. For instance, queue 543 is associated with route $N_{rt}$. Queue bank 540 serves as input to IN-Vector screening bank 550. Each route, such as route X have associated queue 542, undergoes a screening with the IN-Vector computed for that route. The outputs from both the buffer bank 530 and the IN-Vector bank 550 serve as inputs to load controller bank 560. There is a load controller associated with each outgoing link. For instance, controller 562 provides output packets to outgoing link 508 (b5).

Figure 6:
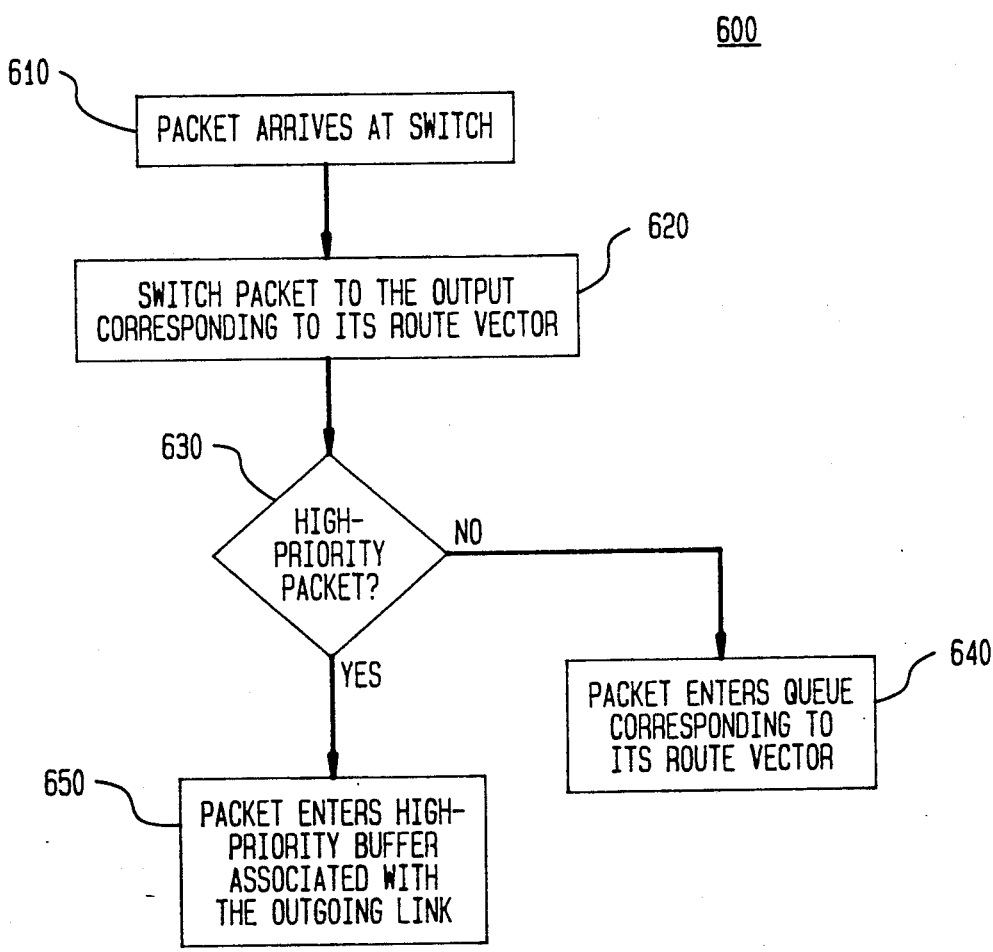
FIG. 6 is a flow diagram for directing packets either to the high-priority buffers or the queues of FIG. 5.

Flow diagram 600 of FIG. 6 depicts the operational characteristics of the input end of the circuit arrangement of FIG. 5. Processing block 610 depicts a packet arriving at switch 510. The packet is switched, as shown by block 620, to the switch output corresponding to its route vector, say, route 1 on output 512. As decision block 630 indicates, if the packet is a high-priority packet, it is forwarded to the buffer associated with the outgoing link; for route 1, the packet is transmitted to buffer 531. If the packet is not a high-priority, then the packet enters the queue corresponding to its route vector, that is, queue 541 for route 1.

Figure 7:
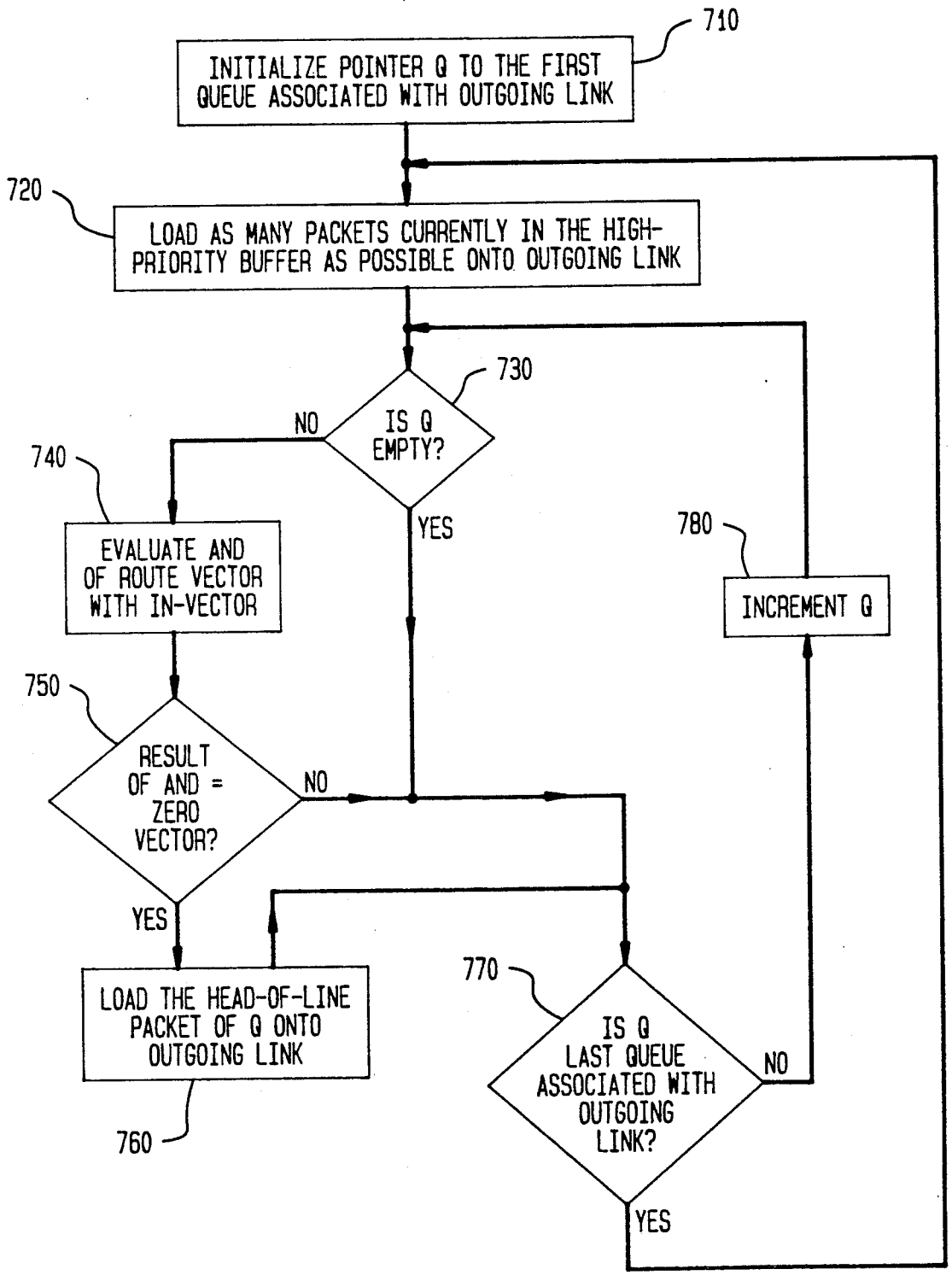
FIG. 7 is a flow diagram for propagating packets from buffers and queues onto associated data channels in accordance with FIG. 5.

Flow diagram 700 of FIG. 7 depicts the operational characteristics of the output end of the circuit arrangement of FIG. 5. As depicted by processing block 710, a pointer Q is initiated to point to the head-of-the-line queued packet. Processing block 720 is then invoked to load as many packets as available onto the associated outgoing channel. Once the buffer has been serviced, decision block 730 is then executed to see if the queue specified by the pointer Q is empty. If it is, then processing returns to block 720. If the queue is non-empty, then the content of the queue register is screened with the associated IN-Vector by the operation of block 740. Decision block 750 is then entered to determine if the result of the AND operation is the zero vector. If it is, then processing block 760 is invoked to load the head-of-line packet corresponding to the pointer Q onto the link via the associated load controller. If the result is non-zero, then it is determined if this is the last queue associated with the outgoing link. If the answer is yes, then block 720 is executed next. If the answer is no, then decision block 730 is entered after the Q pointer is updated by processing block 780.

EXAMPLE

Table 2 below refers to FIG. 1. Table 2 lists the route vectors from the node B to a few destination nodes and performs examples of the logical AND of these vectors with the IN-Vector and OUT-Vector. To avoid complexity, only one route is assumed for each destination node. The AND results with the OUT-Vector show that a packet generated at the node B with the destination node A is not admitted into the network, while those destined for nodes C, D, E, or F are admitted. However, the AND result with the IN-Vector for destination node A shows that intermediate packets already in the network may be forwarded. Thus, even though a packet generated at the node B with the destination node A is not admitted into the network, queued packets are being loaded onto the appropriate outgoing link. This illustrates the difference between the roles of IN-Vector and OUT-Vector in traffic control, and the difference is essential in assuring no deadlock in the network.

TABLE 2

Sample Computation in Packet Control Decisions

| OUT-Vector: | | 0100100110001101 ... |
|---|---|---|
| IN-Vector: | 0100000110001101 ... | |
| Destination Node | Route Vector (Office Data) | The AND With OUT-Vector |
| A | 0000100000000000 ... | 0000100000000000 ... |
| C | 0001000000000000 ... | 0000000000000000 ... |
| D | 0001000001000000 ... | 0000000000000000 ... |
| E | 0001000001010000 ... | 0000000000000000 ... |
| F | 0000001000000000 ... | 0000000000000000 ... |
| Destination Node | Route Vector (Office Data) | The AND With IN-Vector |
| A | 0000100000000000 ... | 0000000000000000 ... |

1.4 Judgement of Congestion Status of Outgoing Links

A load controller (e.g., 561) of an outgoing data channel scans through queues and the high priority buffer connected to the channel. In each scanning cycle, controller 561 loads as many packets as possibly from the high priority buffer and also loads the head-of-line packet from every queue that passes the screening of the IN-vector. If the number of packets that remain stored in a queue or buffer is greater than or equal to a predetermined threshold $N_{bf}$ (say $N_{bf}=16$) after loading one or more packets from it, then the status of the outgoing link is updated as congested.

On the other hand if, in a complete cycle of scanning, no queue or buffer that loads a packet onto the outgoing link remains non-empty, then the status of the outgoing link is updated as non-congested. Meanwhile, there may possibly be packets in the process of entering these queues and buffers. There may also possible be many packets in queues corresponding to routes that currently do not pass the IN-Vector screening.

2. Call Set-Up Methodology in Real-time Communications

In theory, in order to ensure no packet loss, the algorithm needs to subject all packets to controls at the packet level described in Sections 1.2-1.3. However, packets for real-time communications are exempted from these controls. Instead, real-time communications are controlled at the time of call set-up.

Before a periodic packet stream of a real-time call is started, a scout stream with the same periodicity and route of the intended call is transmitted. A scout packet is a "pseudo packet" in the sense that, during its progression through the network, it is treated as a data packet by some of the network functions but as a virtual packet by others. In order for a more comprehensible presentation, Section 2.1 first describes the algorithm for the set-up of a one-way transmission that treats a scout packet as a regular packet throughout. Then, Section 2.2 refines the algorithm for using pseudo packet as scouts.

2.1 Basic Algorithm

A scout packet has the same format as a data packet. Its contents are null except for the indication of the scout identify plus the routing information in the packet header. It is subject to controls at the packet level described in Sections 1.2-1.3 and is assigned an intermediate priority class between those of real-time and non-real-time communications.

If the periodic stream of scout packets enters the network smoothly for a specified length of time, then it is followed by the stream of data packets. In that case, the routing path of a one-way call is clear. The specified time duration is that required for light to travel in the transmission medium having twice the length of a path measured from the call originating node to the last intermediate node on the transmission route. As before, a fixed per-hop overhead is included in the computation of the length of a route. In particular, if there is no intermediate node on the route, then this length reduces to just the fixed overhead.

When a scout packet is denied entry to the network, the call set-up attempt is aborted. It is then up to the nodal function of route selection to decide whether to shift to an alternative route upon reattempt. Upon reattempt, the clock for the scout stream would start anew. The pause time before a reattempt may be designed according to any post-collision strategy in channel access protocols for multi-user communication channels.

Figure 8:
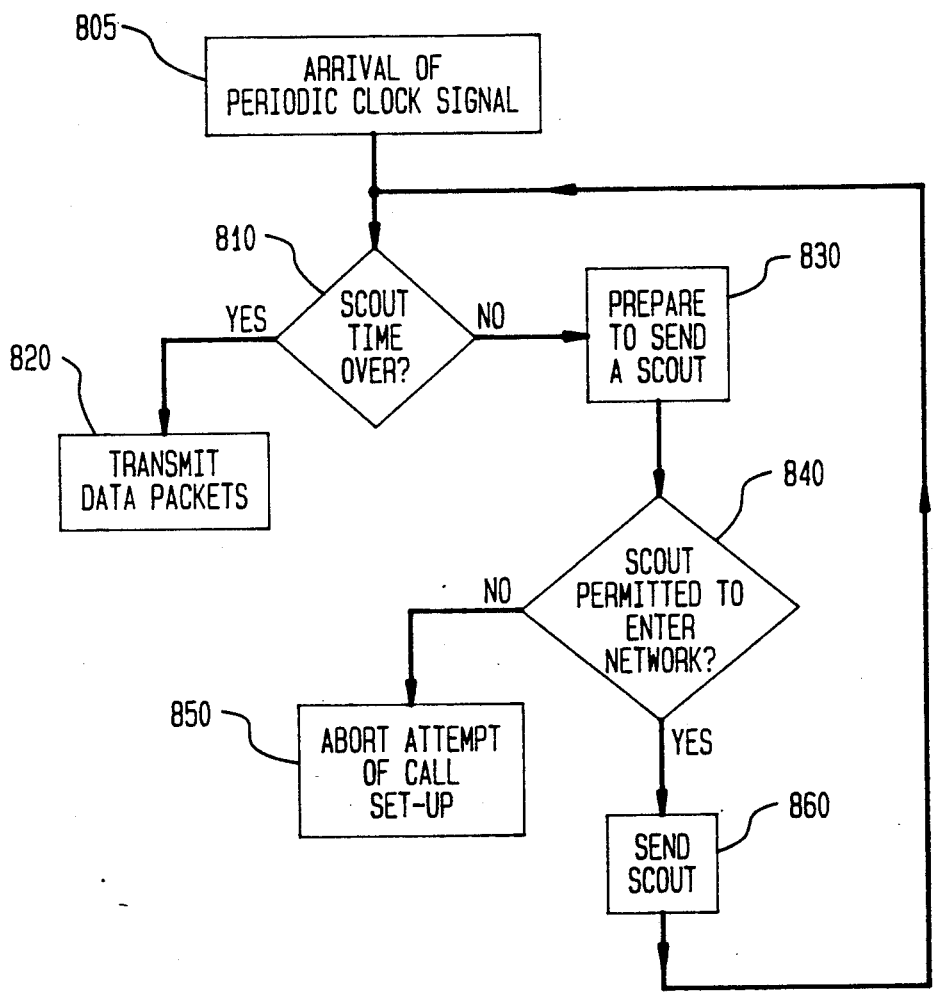
FIG. 8 is a flow diagram for processing scout packets.

Flow diagram 800 of FIG. 8 depicts the call set-up methodology for scout packets. Upon the periodic arrival of the packet clock signal shown by block 805, decision block 810 is executed to determine if the scout time is over. If the time has expired, then data packets are transmitted via processing block 820. If time remains, then block 830 is initiated to prepare a scout to be sent. Decision block 840 tests to see if the scout is permitted to enter the network. If it is denied entry, then the call set-up is aborted by processing block 850. If entry is permitted, the scout packet is sent via block 860.

In the queue at an output of the switch mentioned in Sections 1.3-1.4, entries are naturally managed according to priority classes of packets. Thus scout packets take precedence over non-real-time data packets. The buffering capacity for the class of scout packets is limited to $N_{bf}$ packets. When the outgoing link associated with the buffer is congested, new scout packets arriving at the buffer will be blocked. In other words, when scout packets have achieved their sole mission of detecting congestion, there is no need of further investing network resources on them. This limit on scout packets would leave more spaces in the link transmission capacity for the low-priority packets to fill in.

During a time when the network is heavily loaded, this algorithm for call set-up tends to favor calls with fewer hops. More precisely, a short time duration of the scout stream enhances the probability of a successful call set-up. In particular, the algorithm is most biased toward setting up single-hop calls during busy time.

2.2 Algorithm Refinements

The sole purpose of the scout stream is to detect any traffic congestion along the route of the intended call. Scout packets are transmitted over links in the same fashion as data packets. Thus the presence of a scout stream would emulate the traffic condition as if the real data of the call had entered the transmission medium. However, the detection of congestion can still be achieved if scout packets are handled "virtually" inside a node so that they do not tie up every kind of network resource. More specifically, when a scout packet arrives at an input to the switch inside a node, it can be switched over to the output in a manner much simpler than that for data packets. One possible design of the scout switch is a scanner scanning the arrival of scout packets at all inputs. When the scanner detects a new arrival, it sends a simple signal to the output corresponding to the remaining route ahead of the scout packet. This completes the switching of the scout packet because the (mostly null) content of the scout packet can be reconstructed at the output. The routing information in the header of the reconstructed packet corresponds to just the remaining route and thus may differ slightly from before. This difference has no impact on the mission of the scout packet.

Buffering of scout packets in the queue associated with its remaining route can be implemented by a simple peg count associated with the queue. The count advances upon the arrival of a scout and backs up by one when a scout packet is reconstructed and loaded onto the outgoing link. When the link status is "congested", the peg count is disabled and becomes equivalent to a zero count. In this way, the peg count can only reach as high as $N_{bf}$. Since scout packets are assigned an intermediate priority class, the peg count represents head-of-line packets of the queue.

Figure 9:
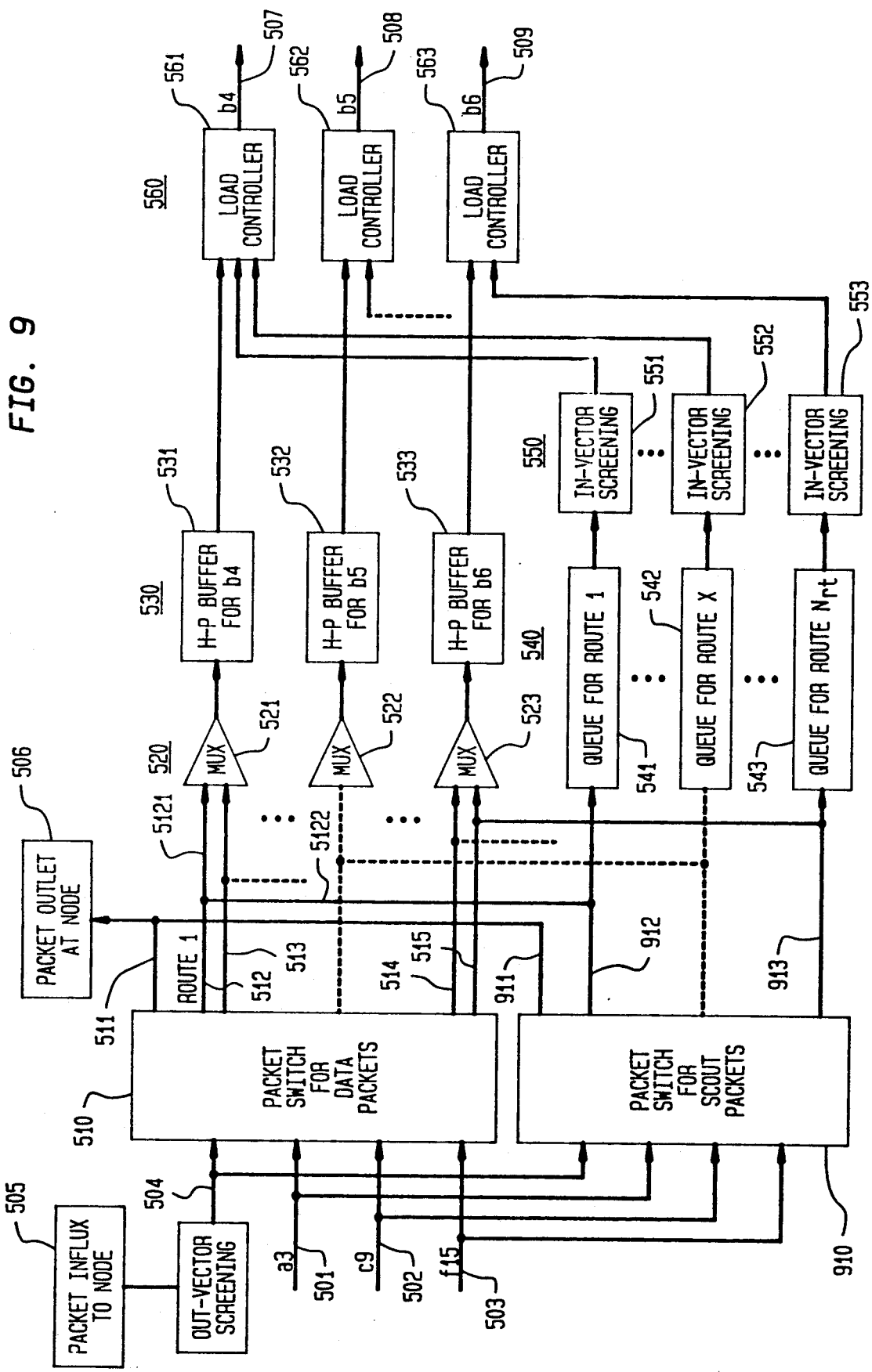
FIG. 9 is an enhanced version of FIG. 5 depicting the arrangement for processing scout packets.

The diagram of FIG. 9 depicts the enhancements to the circuit arrangement of FIG. 5 to process scout packets. The indicia from FIG. 5 are also utilized in FIG. 9 for elements remaining the same in FIG. 9. The added circuitry includes packet switch 910 which switches scout packets (known by the category field in the status vector). Input links 501-504 to switch 910 are the same as to switch 510 and the outputs also serve as inputs to MUX bank 520 and queue bank 540. The operation of the circuitry of FIG. 9 is then substantially the same as in FIG. 5.

So far, the algorithm has only dealt with the set-up of one-way transmission with the assumption that the receiving end is ready to receive as soon as the routing path is cleared by scouts. Certain applications may impose requirements other than just the setting up of the routing path before packets can be transmitted. For example, the receiving end may take some length of time to be "awakened." For another example, a two-way interactive call would require a hand-shake process before the call can flow in both directions. In such applications, after the set-up of the routing path, the transmission of data packets must be delayed by a fixed length of time or until an acknowledgement from the receiving end arrives. During this delay, the call originator needs to transmit time-filler packets periodically to keep the routing path open. This is the equivalent to time-slot reservation in the environment of circuit switching. The priority class and periodicity of such time-fillers should be the same as the data packets of the intended call. Like the scout packets, time-fillers have no content in their data field, hence they can be treated as high-priority pseudo packets.

With reference to FIG. 10, there is shown flow chart 1000 for the situation wherein an acknowledgement from the receiving end is required before data packets can flow. As denoted by processing block 1010, a scout packet is sent via the transmission processing diagramed in FIG. 8. Decision block 1020 is entered to determine if the scout stream has cleared the forward or calling channel. If it has not cleared within one scout time, then the call set-up is aborted via block 1030. If it has cleared, then processing block 1040 is invoked to send time-filler packets using the same route and the same priority as data packets of the intended call. Processing block 1050 is entered to determine if there has been an acknowledgement from the receiver of the arrival of filler packets before time-out. If time expires, then the call set-up is aborted. Otherwise, the actual data packets may then be transmitted, as is indicated by processing block 1060.

Certain detailed aspects of the flow control algorithm have not been fully specified and are meant to be fine tuned in individual applications. One such aspect is buffer sizing as mentioned in Section 1.5. Another is the strategy in timing the reattempt of call set-up, which may follow any of the numerous channel access protocols of multi-user communication channels. Similarly, the timing of a reattempt to enter a packet into the network through the IN-Vector screening is also flexible. Parameters $N_{lk}$, $N_{bf}$ and $N_{pr}$ are also to be adjusted to the need of individual applications.

It is to be understood that the above-described embodiments are simply illustrative of the principles in accordance with the present invention. Other embodiments may be readily devised by those skilled in the art which may embody the principles in spirit and scope. Thus, it is to be further understood that the methodology described herein is not limited to the specific forms shown by way of illustration, but may assume other embodiments limited only by the scope of the appended claims.

What is claimed is:

1. A method for propagating a sequence of control packets through a network composed of a plurality of nodes interconnected by links, each link being utilized for transmitting corresponding control packets, the method for an arbitrary node comprising the steps of
generating a first screening vector as determined by a set of network masks and the control packets, each of said masks being indicative of the network topology,
generating a second screening vector as determined from said first screening vector and a congestion status vector for said arbitrary node, and
propagating said second screening vector as the next succeeding one of the control packets emanating from said arbitrary node.

2. A method for propagating a sequence of control packets through a network composed of a plurality of nodes interconnected by links, each link including a control channel for transmitting corresponding control packets, the method for an arbitrary node comprising the steps of
generating an IN-Vector as determined by a set of network masks and the control packets, each of said masks relating a group of the links to a corresponding incoming control channel and being indicative of the network topology,
generating an OUT-Vector as determined from said IN-Vector and a congestion status vector for said arbitrary node, and
propagating said OUT-Vector as the next succeeding one of the control packets emanating from said arbitrary node.

3. A method for propagating a sequence of control packets through a network composed of a plurality of nodes interconnected by links, each link including a control channel for transmitting a corresponding control packet, the method for an arbitrary node comprising the steps of storing in said arbitrary node a set of network masks, each of said masks relating a group of the links to a corresponding incoming control channel and being indicative of the network topology, periodically receiving a set of control packets propagated by incoming ones of the control channels connected to said arbitrary node, generating an IN-Vector as determined by said set of masks and said set of control packets, determining a congestion status vector for said arbitrary node, generating an OUT-Vector as determined from said IN-Vector and said congestion status vector, and propagating said OUT-Vector as the next control packet emanating from said arbitrary node.

4. The method as recited in claim 3 wherein said step of generating said IN-Vector includes the step of performing a logical AND operation of said set of masks and said set of control packets to produce a corresponding set of ANDed outputs and the step of performing a logical OR operation on said set of ANDed outputs.

5. The method as recited in claim 4 wherein said step of generating said OUT-Vector includes the step of performing a logical OR operation on said IN-Vector and on said congestion status vector.

6. The method as recited in claim 3 wherein each of the links also includes a data channel which propagates a data packet, wherein the method further comprises the steps of translating a destination address embedded in an influx data packet to determine a route vector, performing a logical AND operation of said route vector with said OUT-Vector to yield an influx vector, and admitting the influx data packet to the network if said influx vector is a zero vector; otherwise, denying entry of the influx data packet to the network.

7. The method as recited in claim 6 wherein said step of translating also includes the step of determining if the data packet is a high-priority packet and, if so, unconditionally admitting the data packet to the network.

8. The method as recited in claim 3 for wherein each link also includes a data channel which propagates a data packet, wherein the method further comprises the steps of determining an intermediate route vector in correspondence to the destination address embedded in an intermediate packet, performing a logical AND operation of said intermediate route vector with said IN-Vector to yield a screened vector, and accepting the intermediate packet for propagation if said screened vector is a zero vector; otherwise, storing the intermediate packet for reprocessing.

9. A method for setting-up a real-time call in a network composed of a plurality of nodes interconnected by links, each link including a control channel for transmitting corresponding control packets and a data channel for propagating data packets, the method for an arbitrary node comprising the steps of generating an IN-Vector as determined by a set of network masks and the control packets, each of said masks relating a group of the links to a corresponding incoming control channel and being indicative of the network topology, generating an OUT-Vector as determined from said IN-Vector and a congestion status vector for said arbitrary node, and propagating said OUT-Vector as the next succeeding one of the control packets emanating from said arbitrary node, determining if a scout packet may enter the network on said data channel by translating a destination address embedded in said scout packet to determine a route vector, performing a logical AND operation of said route vector with said OUT-Vector to yield a scout vector, and admitting said scout packet to the network if said scout vector is a zero vector; otherwise, denying entry of said scout packet to the network, and if a predetermined number of said scout packets are admitted entry before a preselected time-out interval, propagating packets representative of the real-time call over the data channel; otherwise, aborting the setting-up of the real-time call.

10. A method for setting-up a real-time call in a network composed of a plurality of nodes interconnected by links, each link including a control channel for transmitting corresponding control packets and a data channel for propagating data packets, the method for an arbitrary node comprising the steps of propagating a sequence of control packets through the network, said step of propagating including the steps of storing in said arbitrary node a set of network masks, each of said masks relating a group of the links to a corresponding incoming control channel and being indicative of the network topology, periodically receiving a set of control packets propagated by incoming ones of the control channels connected to said arbitrary node, generating an IN-Vector as determined by said set of masks and said set of control packets, determining a congestion status vector for said arbitrary node, and generating an OUT-Vector as determined from said IN-Vector and said congestion status vector, determining if a scout packet may enter the network on said data channel by translating a destination address embedded in said scout packet to determine a route vector, performing a logical AND operation of said route vector with said OUT-Vector to yield a scout vector, and admitting said scout packet to the network if said scout vector is a zero vector; otherwise, denying entry of said scout packet to the network, and if a predetermined number of said scout packets are admitted entry before a preselected time-out interval, propagating packets representative of the real-time call over the data channel; otherwise, aborting the setting-up of the real-time call.

* * * * *